US008103568B1

(12) United States Patent
Yeung et al.

(10) Patent No.: US 8,103,568 B1
(45) Date of Patent: Jan. 24, 2012

(54) FRAUDULENT TRANSACTION IDENTIFICATION SYSTEM

(75) Inventors: Raymond Wiaming Yeung, Toronto (CA); Anna Wachter, Toronto (CA)

(73) Assignee: Bank of America Corporation, Charlotte, NC (US)

( * ) Notice: Subject to any disclaimer, the term of this patent is extended or adjusted under 35 U.S.C. 154(b) by 659 days.

(21) Appl. No.: 12/252,030

(22) Filed: Oct. 15, 2008

(51) Int. Cl.
*G06Q 40/00* (2006.01)
(52) U.S. Cl. ......................................................... 705/35
(58) Field of Classification Search .................... 705/35, 705/26.1, 318, 39, 26.35
See application file for complete search history.

(56) References Cited

U.S. PATENT DOCUMENTS 7,403,922 B1 * 7/2008 Lewis et al. ..................... 705/38

OTHER PUBLICATIONS

"Iovation Leads Know Your Customer Initiative; Partnerships with 192.com, Authentify and Quova Form Foundation for Removing Anonymity Online and Simplifying Management of Customer Verification Data." Business Wire May 17, 2006 (2 pages).*
Riva Richmond. "Business Solutions; We Know Where You Are: With new software, Web sites can tell what city a visitor is coming from; That can be useful information." Wall Street Journal Sep. 29, 2008 (3 pages).*
"Quova: Quova Joins Oracle Extended Identity Management Ecosystem; Quova Integrates Geolocation Data to Oracle Identity Management." M2 Presswire Feb. 12, 2008, (2 page).*
"Fraudsters Pocket $3 Billion From U.S. eCommerce in 2006." PR Newswire Nov. 14, 2006 (3 pages).*
"Computop Integrates Quova's IP Geolocation." Wireless News Oct. 7, 2008 (2 pages).*

* cited by examiner

*Primary Examiner* — Elda Milef
(74) *Attorney, Agent, or Firm* — Michael A. Springs; Moore and Van Allen; Ryan Harris

(57) ABSTRACT

Embodiments of the present invention are directed to methods, systems and computer program products for identifying fraudulent transactions. In general, transaction information is inputted into the system and an address is received from such information. A database is then queried to determine if the address already exists in the database. A determination is made whether or not the transaction is suspicious in response to the address existing in the database entry. Alternatively, in response to the address not existing in the database entry, a determination is made as to whether or not the transaction is suspicious based on a geocode. A geocode is a geographic location or coordinates of an address.

15 Claims, 5 Drawing Sheets

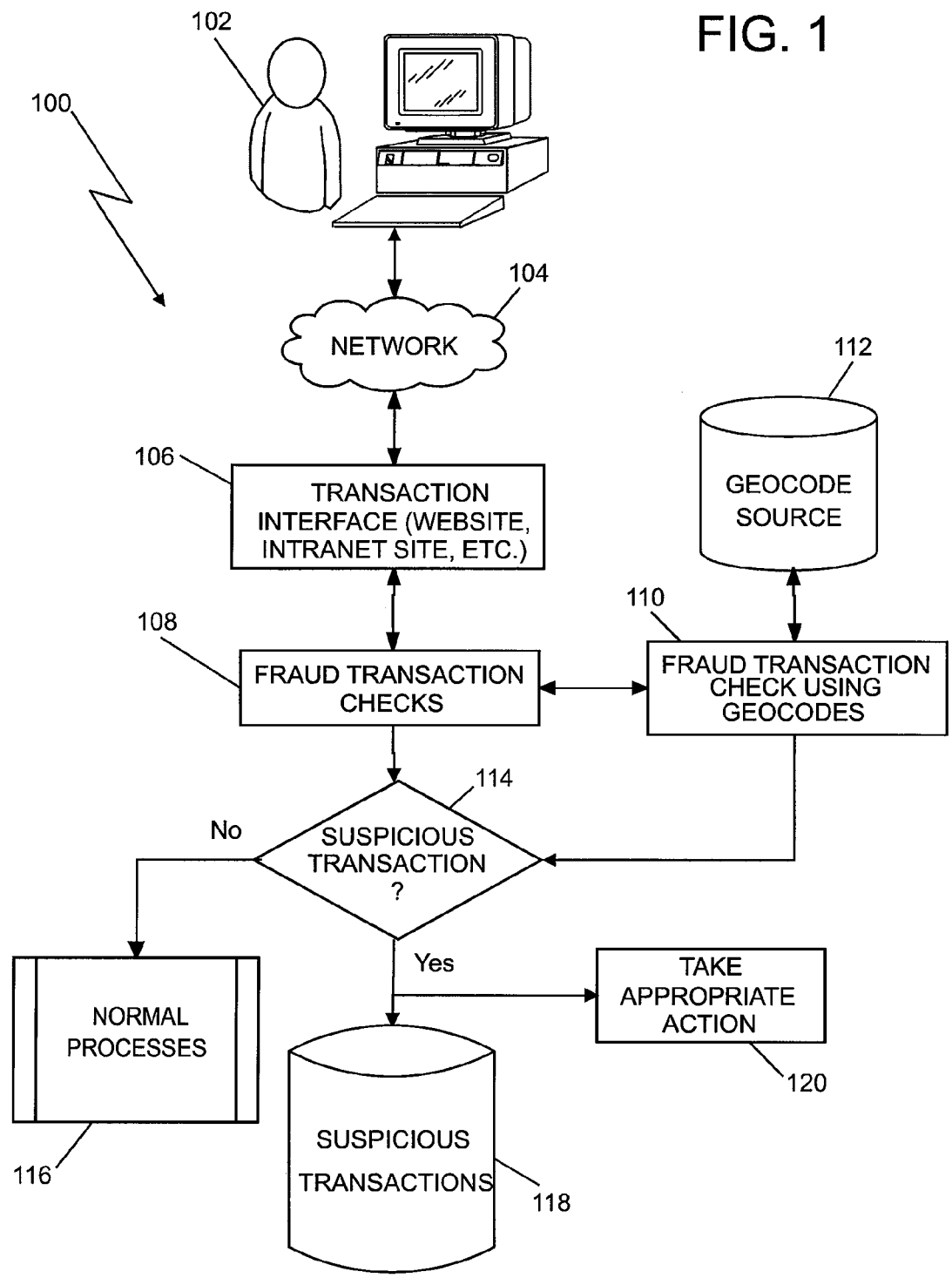

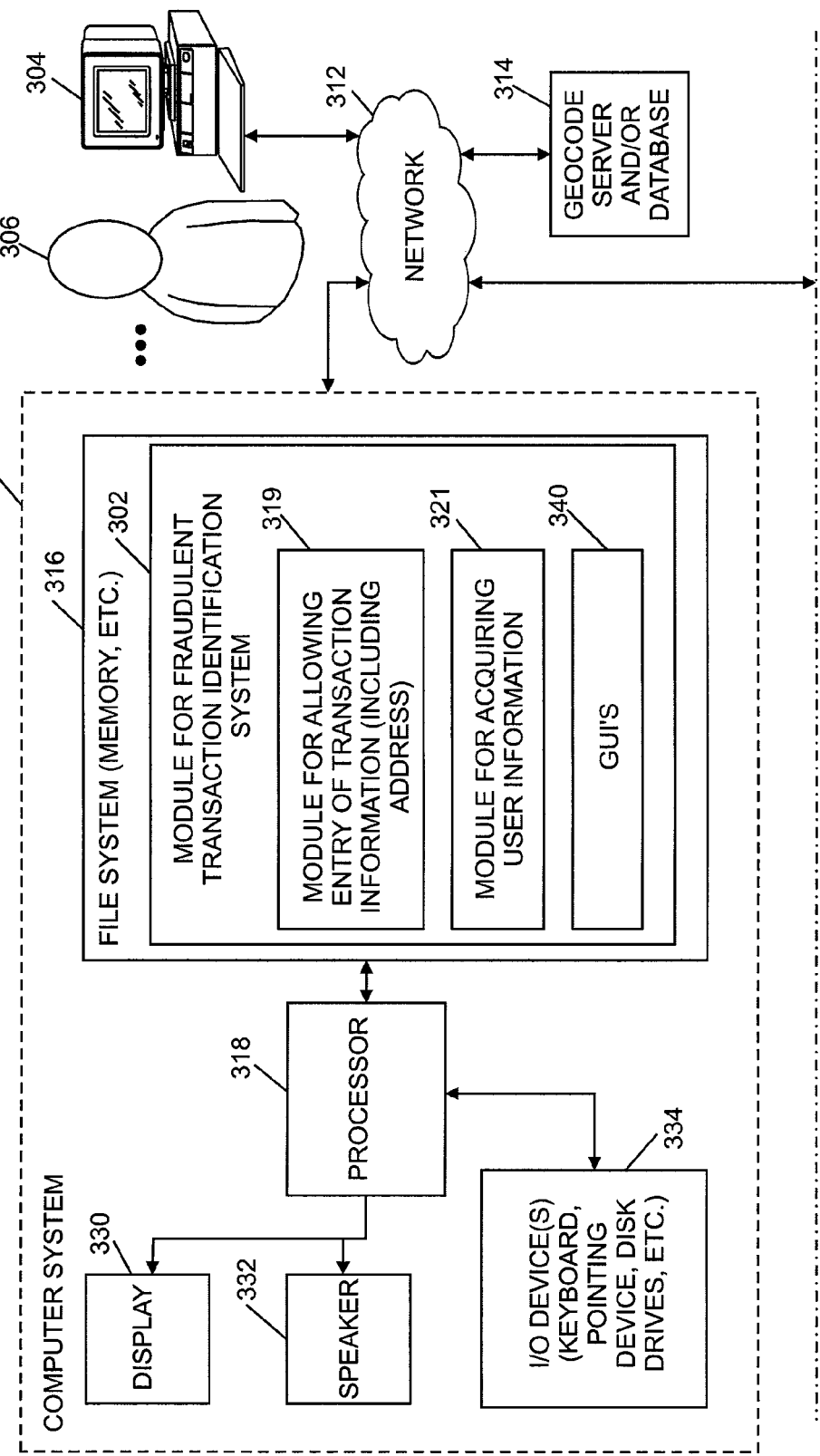

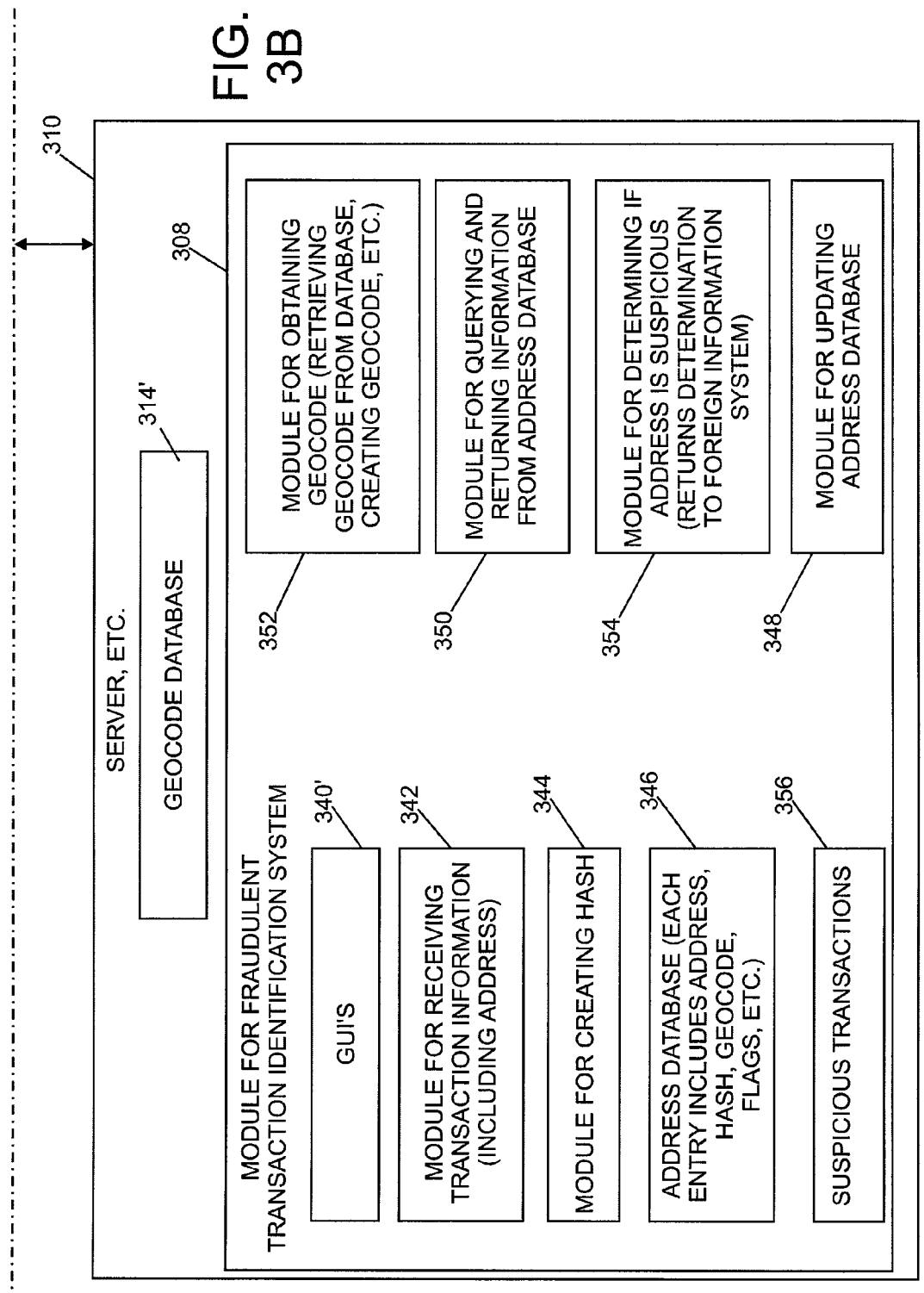

US 8,103,568 B1

FRAUDULENT TRANSACTION IDENTIFICATION SYSTEM

BACKGROUND

Currently, banks allow their customers to order foreign banknotes and perform other transactions via the internet. However, fraud has been committed by persons who order banknotes from another's bank account or make changes to the shipping addresses of existing banknote orders. Such persons may repeatedly use the same shipping address location for the banknote delivery. There is no current method to determine if a transaction is suspicious if repeated orders are being shipped to the same address or location within certain time intervals.

Thus, there is a need to identify if a transaction is suspicious or fraudulent based on repeated orders being received for shipment to the same address or location within a certain time interval.

SUMMARY

In accordance with an aspect of the present invention, a method for identifying fraudulent transactions is disclosed. The method includes receiving an address and creating a hash code from the address. Next a database is queried to determine if the hash code exists in the database. A determination is made as to whether or not the transaction is suspicious in response to the hash code existing in the database. Further, in response to the hash code not existing in the database, a determination is made as to whether or not the transaction is suspicious based on a geocode. The geocode is an address code identifying a location of the address such that every address location has only a single geocode associated therewith.

In accordance with another aspect of the present invention, another method for identifying fraudulent transactions is disclosed. The method includes inputting transaction information into the system and an address is received from such information. A database is then queried to determine if the address already exists in the database. A determination is made whether or not the transaction is suspicious in response to the address existing in the database entry. Alternatively, in response to the address not existing in the database entry, a determination is made as to whether or not the transaction is suspicious based on a geocode. A geocode is a geographic location of an address.

In accordance with another aspect of the present invention, a system for identifying fraudulent transactions is disclosed. The system includes a computer processor and a data structure operable on the processor to present a graphical user interface for a user to input transaction information, where the transaction information includes an address. Another data structure operable on the processor creates a hash code from the address. Yet another data structure operable on the processor queries a database to determine if the hash code exists in the database. The system also includes a data structure operable on the processor to determine whether or not the transaction is suspicious in response to the hash code existing in the database. The system further includes a data structure operable on the processor to determine whether or not the transaction is suspicious based on a geocode in response to the hash code not existing in the database.

In accordance with another aspect of the present invention, a computer-readable medium having computer executable instructions for performing a method for identifying fraudulent transactions is disclosed. The method includes inputting transaction information the system and an address is received from such information. A database is then queried to determine if the address already exists in the database. A determination is made whether or not the transaction is suspicious in response to the address existing in the database entry. Alternatively, in response to the address not existing in the database entry, a determination is made as to whether or not the transaction is suspicious based on a geocode.

In one embodiment, the geocode is an address code identifying a location of the address such that every address location has only a single geocode associated therewith. In another embodiment, the geocode is a geographic location of an address.

Other aspects and features of the present invention, as defined by the claims, will become apparent to those skilled in the art upon review of the following non-limited detailed description of the invention in conjunction with the accompanying figures.

BRIEF DESCRIPTION OF THE DRAWINGS

FIG. 1 is a flow chart of an example of a system for identifying fraudulent transactions in accordance with an embodiment of the present invention.

DETAILED DESCRIPTION

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Figure 2A:
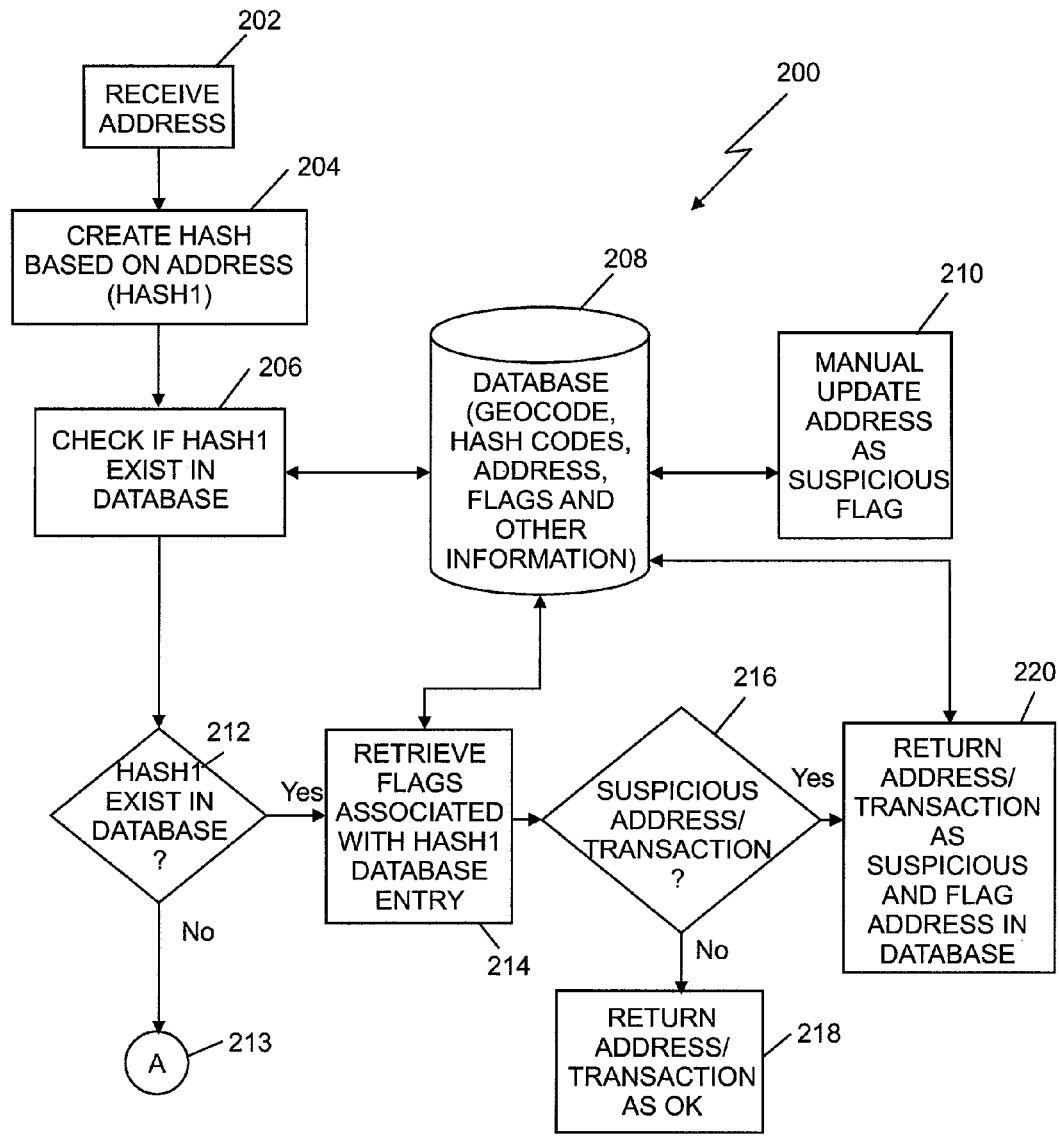
FIGS. 2A and 2B (collectively FIG. 2) is a flow chart of an example of a method for identifying fraudulent transactions in accordance with an embodiment of the present invention FIGS. 3A and 3B (collectively FIG. 3) are a block schematic diagram of an example of a system for identifying fraudulent transactions in accordance with another embodiment of the present invention.
Figure 2B:
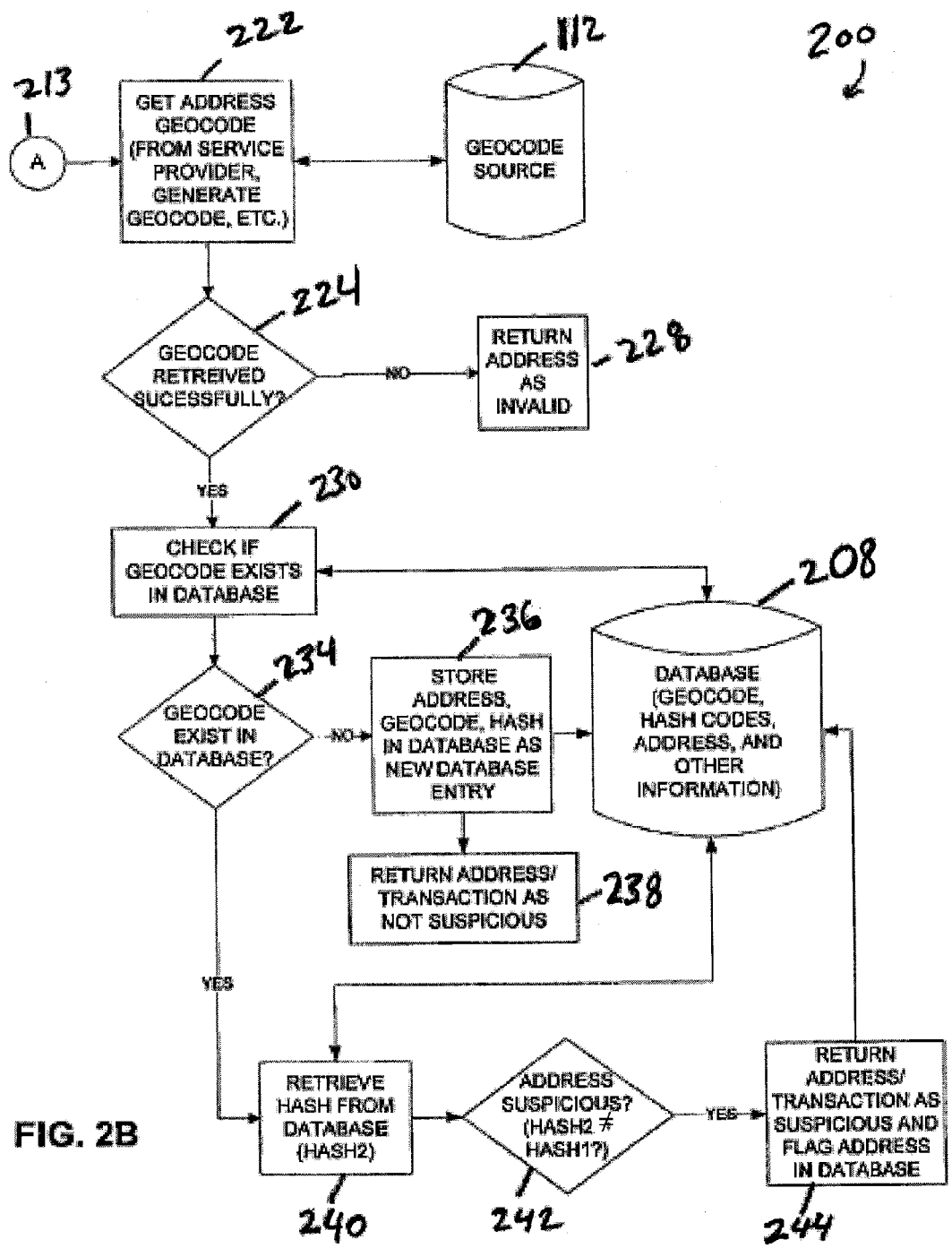

Embodiments of the present invention are directed to methods, systems and computer program products for identifying fraudulent transactions. FIGS. 1, 2A-B (collectively FIG. 2) and FIG. 3 illustrate methods, systems and computer program products for detecting suspicious transactions using geocodes. Such methods and systems are described in more detail below with regard to FIGS. 1-3.

FIG. 1 illustrates a system 100 which allows for a transaction to occur and includes a fraudulent transaction identification system 110. The transaction is any action, such as a financial transaction, a business transaction, a consumer transaction, etc., that is performed by a user 102. The user 102 is any entity who desires to conduct banking transactions, such as a customer of a bank, other persons, a company, an electronic device, or any other entity. It should be understood that this disclosure is not only applicable to transactions, but is also applicable to any other situation where an address is employed in an activity. For example, embodiments of the present invention is applicable to internet fraud, voter fraud, postal fraud, governmental programs/activities, programs/offers limited to one offer per household, or any other activity (whether a transaction or not) where a person's or company's address is an element of the activity.

To begin the transaction, a user 102 enters into a transaction interface 106 via a network 104. The network 104 is any type of network, such as a wide area network (WAN), a local area network (LAN), the Internet, a wireless network, a Bluetooth network, and the like. The transaction interface 106 is any type of interface to which the transaction is initiated, such as a software interface, internet website, paper, and the like. The transaction interface 106 includes one or more graphical user interfaces which will be described later with regard to FIG. 3. In any event, a user 102 will input transaction information into the transaction interface 106, including the type of transaction to be performed, the transaction money amount, an address to receive a transactional product (such as a banknote), the entity's name, the bank account and other like information. After such information is entered into the transaction interface 106, the transaction interface 106 transmits the information to the financial institution. Although any type of transaction or other activity may be included in the embodiments of the present disclosure, various embodiments are directed to a transaction involving a banknote transaction (e.g. a foreign banknote transaction).

Once the transaction information is received by the financial institution, a fraudulent transaction check 108 occurs. Each fraudulent transaction check 108 includes different criteria regarding the transaction that must be met in order for the transaction and/or address inputted in the transaction to be deemed suspicious or fraudulent. According to one embodiment, each of the fraud check criteria is defined by a financial institution. In one embodiment, any transactions that are returned as suspicious (such as via the method 200), then the system 100 may perform fraudulent checks 108 on that transaction to further determine if the transaction is fraudulent. The fraudulent check 108 may occur with or without the suspicious check (e.g. method 200) or the suspicious check (e.g. method 200) may be an add-on component to the fraudulent checks 108. In any event, the fraudulent check may determine whether or not the transaction is suspicious and/or if the transaction is fraudulent.

One of the fraud transaction checks 108 includes a fraudulent transaction check using geocodes as shown in block 110. Embodiments of the fraudulent transaction check using geocodes 110 are substantially described below with respect to FIGS. 2A and 2B (collectively FIG. 2). The fraudulent transaction check using geocodes 110 may access a geocode source 112 which is also described later with regard to FIG. 2. Regardless, after the fraudulent transaction check using geocodes 110 and/or the fraudulent transaction checks 108 are performed, the system 100 proceeds to decision block 114.

In decision block 114, the system 100 determines whether or not the transaction is suspicious and/or fraudulent. Such determination is made with information received from fraudulent transaction check using geocodes 110 and/or the fraudulent transaction check 108. If the transaction is determined to not be suspicious, then normal processing occurs, as shown in block 116.

However, if the transaction is determined to be suspicious in blocks 108 or 110, then the transaction is stored in a database 118 as a suspicious transaction. Additionally, if the transaction is returned suspicious, the suspicious transaction may be immediately reviewed by the financial entity or any other entity so that appropriate action may be taken, as shown in block 120. In some embodiments, appropriate action includes determining which bank accounts the banknote is being withdrawn from and/or to, determining the address of the fraudulent transaction, determining the entity in charge of the suspicious transaction, taking legal or policing action against the entity in charge, cancelling transactions, flagging certain bank accounts, flagging/saving suspicious IP addresses, blocking access to certain bank accounts and the like.

Turning now to FIGS. 2A and 2B, embodiments of a method 200 for the fraudulent transaction check using geocodes 110 are illustrated. The method 200 is performed as block 110 of FIG. 1.

Referring back to FIG. 2A, as represented in block 202, the previously inputted address of the transaction is received by the system 100. In block 204, a hash code (hash1) is created based on the inputted address. A hash code is a way of computing a small digest numeric key from a long string or even an arbitrary clump of bytes. A hash code is produced by hash function which may be a pre-defined procedure or mathematical formula for turning some kind of data into a relatively small integer that may serve as an index into an array. For example, the address "3157 43$^{rd}$ Street, Astoria, N.Y. 11103" may be converted into hash code "D345FQ1." By way of another example, the address "3157 43 RD ST, Astoria, N.Y. 11103" may be converted into hash code "2F65RF1." Further, the address "3157 43RD STREET APT 1, LONG ISLAND CITY N.Y. 11103" may have a hash code of "O4TE113." As can be readily seen, each of these addresses is similar in that they may all have the same physical mailing location where a banknote may be delivered. However, each of these addresses has a different hash code based on the differences in the address wording.

After the hash code is created in block 204, the method 200 advances to block 206 to check if the created hash code (hash1) exists in the database 208. The database 208 includes multiple entries and each entry includes a geocode, hash code, an address, flags and other information related to the transactions and/or previous transactions. Thus, in block 206, the database 208 is queried to determine if hash1 already exists in one of the database entries and a value of "yes" or "no" is returned to block 212.

As represented in block 212, a determination is made whether or not hash1 exists in the database based on the value received by block 206. If hash1 does not exist in the database 208, the method 200 branches to block 213 which continues at block 213 of FIG. 2B, which is discussed in more depth below with regard to FIG. 2B. By hash1 not existing in the database, this indicates that the address is a newly entered or worded address. If hash1 already exists in the database, then the method 200 branches to block 214.

As represented in block 214, the address geocode flag is retrieved from the database 208 under the same database entry associated with hash1. In some embodiments, elements in the database entry associated with hash1 are also retrieved in block 214, such as the address, geocode and other transaction information to determine if the address is suspicious. In any event, the information retrieved from the database in block 214 is analyzed to determine whether the transaction is suspicious or not. In one embodiment, the address is deemed suspicious if the retrieved address geocode flag has a value which indicates that the transaction is suspicious. In another embodiment, the address is deemed suspicious if the address retrieved from the database 208 does not match the inputted address. In yet another embodiment, the address is deemed suspicious if the inputted address has been the subject of repeated transactions within a certain predetermined time interval. Other pre-determined criteria may also determine whether or not the address is suspicious.

It should be understood that the transaction, the address or a combination thereof may be determined to be suspicious. Where the transaction is determined to be suspicious, the address may also, or alternatively, be deemed to be suspicious and vice versa.

In block 210, according to one embodiment, one or more addresses are manually flagged as suspicious so that when these addresses are checked for suspicious activity, they will automatically return a flag indicating that the address and/or transaction is suspicious. Such manual entry allows a financial institution to monitor entities and addresses and/or flag certain known addresses as addresses to automatically mark as suspicious even though the system may not deem these addresses to be suspicious based solely on the inputted address.

In decision block 216, the method 200 may branch to block 218 if the address is not determined to be suspicious. In such instance, the transaction is processed normally, as shown in block 116 of FIG. 1.

Alternatively, in block 216, if the transaction is determined to be suspicious, the method 200 will branch to block 220 where the transaction is returned as a suspicious transaction and the address of the suspicious transaction is flagged in the database 208. As previously described in block 114 of FIG. 1, if the address if returned as suspicious, the address is saved in database 118 as a suspicious transaction and the bank may take appropriate action, as shown in block 120.

As mentioned above with regard to decision block 212 of FIG. 2A, if hash1 does not exist in database 212, then the method 200 branches to block 213. Referring to FIG. 2B, block 213 directs the method 200 to block 222 where a geocode is obtained.

A geocode (i.e. a geospatial entity object (GEO) code) is a representation format of a geospatial coordinate measurement used to provide a standard representation of an exact geospatial point three-dimensional location at, below or above the surface of the earth. The process of geocoding includes converting an address (e.g. "3157 43$^{rd}$ Street, Astoria, N.Y. 11103") into geographic coordinates (e.g. <−73.915782, 40.758853, 0>). Using the examples presented above, the addresses "3157 43$^{rd}$ Street, Astoria, N.Y. 11103", "3157 43 RD ST, Astoria, N.Y. 11103", and "3157 43RD STREET APT 1, LONG ISLAND CITY N.Y. 11103" all have the same geocode coordinates of (−73.915782, 40.758853, 0) because they are all located at the same physical location. In one embodiment, a geocode is a representation of one or more of the following: latitude, longitude, altitude, date, time, coordinate reference system, internet protocol address, geocode registry format number, and other geospatial attributes.

The geocode is obtained by retrieving the geocode from a geocode source 112. In one embodiment, the geocode source 112 is a service provider that provides a geocode based on the address that is provided. For example, the geocode service provider could be Google Maps API, which can be found at http://maps.google.com, http://code.google.com/apis/maps/, or http://earth.google.com/. To retrieve a geocode, an HTTP request can be sent to the geocode service provider and the geocode service provider will return the geocode coordinates. The geocode service may also be accessed by using Google's GclientGeocoder object. Example of a simple KML code which will determine geocode includes:

<kml xmlns="http://earth.google.com/kml/2.0">
  <Response>
    <name>3157 43$^{rd}$ Street, Astoria, N.Y. 11103</name>
    <Status>
      <code>200</code>
      <request>geocode</request>
    </Status>
  </Response>
</kml>

In this example, the geocode will be returned in KML or XML code. Other programming languages may also be employed. In another embodiment, the geocode source is a geocode database that is stored on a server. Additionally, other means for obtaining a geocode in block 222 includes generating a geocode or other means for retrieving a geocode. In any event, the geocode that is obtained is based on the address that has previously been inputted by the user 102.

After obtaining the geocode, the method 200 advances to decision block 224 where a determination is made whether or not the geocode was successfully retrieved or obtained. If the geocode is not successfully retrieved or obtained in decision block 224, the method 200 branches to block 228 which returns the inputted address as invalid. At this point, the user 102 may re-enter the address or other transaction information in block 106 via network 104, as previously described with regard to FIG. 1.

On the other hand, if the geocode is successfully retrieved or obtained in block 224 of FIG. 2B, the method 200 then will branch to block 230 where the geocode is cross-referenced to the database 208 to determine whether or not the geocode exists in database 208. To make such determination, a request is sent to the database 208 and, in response, a value of either "yes" (i.e. the geocode exists in the database) or "no" (i.e. the geocode does not exist in the database) is returned in block 230.

In decision block 234, the determination of whether the geocode does or does not exist in the database directs the method to either block 236 or block 240. If the geocode is not determined to exist in the database, the method 200 branches to block 236 where the transaction is deemed valid and a new database entry, including geocode, hash code, address, etc., is stored in the database 208. Since the transaction is deemed to be valid and therefore not fraudulent, the transaction is returned as valid and not suspicious, as shown in block 238. At this point, normal processing of the transaction occurs, as previously mentioned in block 116 of FIG. 1.

On the other hand, in decision block 234, if the geocode does exist in the database, the method 200 branches to block 240. In this case, potentially fraudulent activity is identified because hash1 was not in the database but the geocode associated with hash1 is in the database. In block 240, the hash code (hash2) that is associated with the geocode in the database entry is retrieved from the database 208. To retrieve hash2, a request is sent to the database 208 to receive the hash code associated with the same database entry with the geocode. Hash2 is then returned from the database, as shown in block 240. As previously mentioned with respect to block 206 of FIG. 2A, hash1 was not in the database and therefore, hash1 must be different from hash2.

In decision block 242, a determination is made whether or not the address is suspicious. In making this determination, the system will verify that hash2 is not equal to hash1. If these two hashes are not equal, then the transaction and/or address is flagged as suspicious and the originally inputted address is flagged in the database 208. In one embodiment, predetermined actions are automatically taken in response to suspicious transaction being identified, such as presenting an alert, cancelling the transaction, notifying the financial institution and/or a bank account owner, delaying the transaction for review, monitoring the transaction, and the like.

As previously discussed with reference to FIG. 1, once the address is returned as suspicious, appropriate action will be taken and the transaction is saved in database 118 as a suspicious transaction.

FIG. 3 is a block schematic diagram of an example of a system 300 for fraudulent transaction identification in accordance with another embodiment of the present invention. The system 300 includes a module for fraudulent transaction identification system 302 operable on a computer system 304 or similar device of a user 306 or a client. Alternatively, in addition to the module for fraudulent transaction identification system 302 on the user's computer system 304 or client, the system 300 may include a module for fraudulent transaction identification system 308 operable on a server 310 and accessible by the user 306 or client 304 via a network 312. The methods 100 and 200 may be embodied or performed by the module for fraudulent transaction identification system 302 or the server module for fraudulent identification transaction system 308. For example, the methods 100 and 200 may be performed by the module for fraudulent transaction identification system 302. In another embodiment of the invention, the methods 100 and 200 may be performed by the server module for fraudulent transaction identification system 308. In a further embodiment of the present invention, some of the features or functions of the methods 100 and 200 may be performed by the module for fraudulent transaction identification system 302 on the user's computer system 304 and other features or functions of the methods 100 and 200 may be performed on the server module for fraudulent transaction identification system 308.

One or more geocode servers or databases 314 may be operable on the server 310 and may be accessible by the system 300 via the network 312. The geocode server and/or database 312 may be accessed by the server module for fraudulent transaction identification system 308. As previously mentioned, the geocode server and/or database 314, 314' may be a service provider or database that may return a geocode based on an inputted address. As shown, the geocode server and/or database 314' may be operable on the server 310 or the geocode server and/or database 314 may be completely separate from server 310. The network 312 may be the Internet, a private network or other network as previously mentioned. Each computer system 304' may be similar to the exemplary computer system 304 and associated components as illustrated in FIG. 3.

The module for fraudulent transaction identification system 302 and/or 308 may be a self contained system with imbedded logic, decision making, state based operations and other functions that may operate to perform fraudulent transaction checks.

The module for fraudulent transaction identification system 302 may be stored on a file system 316 or memory of a computer system 304. The module for fraudulent transaction identification system 302 may be accessed from the file system 316 and run on a processor 318 associated with the computer system 304.

The module for fraudulent transaction identification system 302 includes a module for allowing entry of transaction information 319. The module for allowing entry of transaction information 319 allows the user 306 to input various transaction information associated with a transaction such as the address, bank accounts, user information and the like as previously described with respect to FIGS. 1 and 2. The module for allowing entry of transaction information 319 is accessed or activated whenever the user 306 desires to input information and calls other module such as the graphical user interface 340 as described below. At this point, entry of transaction information is received by the module for fraudulent transaction identification system 308 on the server 310 via the network 312.

The module for fraudulent transaction identification system 302 also includes a module for acquiring user information 321. This module 321 acquires information about the user based on the user's input of data, such as the user's IP address, user's inputted information and the like. Such information may be useful in tracking down a person who commits a fraudulent transaction.

The user's computer system 304 also includes a display 330 and a speaker 332 or speaker system. Any graphical user interfaces 340 associated with the module for fraudulent transaction identification system 308 is presented on the display 330. Speaker 332 may present any voice or other auditory system signals or information to the user 306. The users computer system 304 also includes one or more input devices, output devices or combination input and output devices collectively I/O devices 334. The I/O devices 334 include a keyboard, computer pointing device or similar means to control input of information for the module for the transaction identification system as described herein. The I/O devices 334 also include disk drives or devices for reading computer media including computer readable or computer operable instructions.

The server module for fraudulent transaction identification system 308 includes a module for receiving transaction information 342. The module for receiving transaction information 342 receives any data any computer or server such as geocode information, address information, hash codes, user information and the like. Inputted transaction information is received, for example, from the module for allowing entry or transaction information 319 located on the user's computer 304. The module for receiving transaction information 342 is activated or accessed by other modules in the fraudulent transaction identification system module 308. For example, the module for receiving transaction information 342 transmits the received address to the module for creating hash 344, the module for updating the address database 348 or any other module. The module for receiving transaction information 342 is operable in block 202 of FIG. 2A where the addresses are received.

The server module for fraudulent transaction identification system 308 also includes a module for creating hash 344. The module for creating a hash 344 operates to create a hash code based on the address information received from the module for receiving transaction information 342. As previously described with respect to block 204 of FIG. 2, the hash code is a numerical formula to create a short data code based on a long string of information or characters. The module for creating hash 344 is accessed and activated by other modules in the system 300. After creating of each hash code, the module for creating hash 344 transmits the hash code into the address database 346 and saves it in each entry.

The server module for fraudulent transaction identification system 308 further includes an address database 346 which is a series of entries based on transaction information received. Each database entry includes transaction information, including the address, the hash, geocode, flags, previous transaction information, or any other transaction information. The address database is stored on the server 310 or an external server 314. The address database 346 is similar or the same database as database 208 as shown in FIGS. 2A and 2B.

The server module for fraudulent transaction identification system 308 also includes a module for updating address database 348. The module for updating address database 348 works to update the address database 346 after receiving information to be stored in the address database 346. The module for updating the address database 348 may also retrieve information from the address database 346 and/or transfer that information to other modules in the system 300.

The server module for fraudulent transaction identification system 308 also includes a module for querying and returning information from the address database 350. This module 350 queries the address database 346 to obtain one or more entries in the database 346. One or more entries will be transmitted to and received by the module 350. The entry that has been retrieved by the module 350 is then transferred to another module in the system 300 for further processing.

The server module for fraudulent transaction identification system 308 also includes a module for obtaining a geocode 352. As previously discussed with respect to FIGS. 1 and 2, a geocode may be obtained from various sources including from a geocode database 314, from the service provider 314', by creating a geocode or by any other means. The module for obtaining a geocode 352 retrieves the geocode information and works with the various service providers to obtain the geocode and transfer the geocode to another module in the system 300 for further processing.

The server module for fraudulent transaction identification system 308 also includes a module for determining if the address is suspicious 354. This module 354 is activated in blocks 114 of FIG. 1 and blocks 216 and 242 of FIG. 2. The module for determining if the address is suspicious 354 may return a value indicating the transaction is suspicious if: 1) the address is flagged as suspicious, 2) if the address is hash code (hash2) retrieved from the database is not equal to the hash code (hash1) that has been inputted previously, as shown in block 242, 3) a pre-defined criteria by a system operator is not met, 4) repeated transactions are performed to the same address or geocode within a certain time interval, and the like. The module for determining if the address is suspicious 354 returns the determination that the address is suspicious or not suspicious to a foreign information system (FIS), for example, as shown in FIG. 1. Block 114 of FIG. 1 then transfers either a "yes" value or a "no" value from decision block 114 to indicate that the transaction is suspicious or not suspicious, respectively. In addition, the module for determining the address is suspicious 354 stores the suspicious transaction information in the suspicious transaction database 356 on the server 310.

The suspicious transactions 356 is a database stored on the server module for fraudulent transaction identification system 308. The suspicious transactions database 356 is equivalent to or similar to the suspicious transaction database 118 shown in FIG. 1, as previously described.

The module for fraudulent transaction identification system 302, 308 includes graphical user interfaces 340, 340', as previously mentioned. The module for fraudulent transaction identification system 302, 308 allows one or more predetermined graphical user interfaces 340 to be presented to the user 306 in order for the user 306 to input address information, transaction information, user information and the like into the system 300. The graphical user interfaces 340 are predetermined and/or presented in response to the user 306 indicating the user 306 would like to perform a transaction. The predetermined graphical user interfaces 340 are generated by the module for fraudulent transaction identification system 302, 308 and are presented on the display 330 at the computer system 304. Graphical user interfaces 340 also include graphical user interfaces that permit the user 306 to view the result and query any of the databases and/or generate reports and/or standardize documents.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A method for identifying fraudulent transactions, comprising:
   receiving transaction information that comprises a physical address;
   creating, via a computer processing device, a hash code based on the physical address;
   querying, via a computer processing device, a database to determine if the hash code exists in the database, wherein the transaction is considered suspicious if the hash code exists in the database; and
   if the hash code does not exist in the database:
      obtaining a geocode based on the physical address, wherein the geocode comprises an address code identifying a location of the physical address such that every physical address location has only a single geocode associated therewith;
      querying the database to determine if the geocode exists in the database; and
      determining that the transaction is suspicious if the geocode exists in the database.

2. The method of claim 1, wherein the obtaining a geocode based on the physical address comprises retrieving a geocode from a service provider based on the physical address.

3. The method of claim 1, wherein the determining that the transaction is suspicious if the geocode exists in the database further comprises:
   retrieving from the database a hash code that is associated with the geocode;
   comparing the hash code that is associated with the geocode with the hash code created from the address; and
   indicating that the transaction is suspicious in response to the hash code that is associated with the geocode not being equal to the hash code created from the address.

4. The method of claim 1, wherein the determining that the transaction is suspicious in response to the geocode existing in the database further comprises flagging the address in the database.

5. The method of claim 4, wherein querying the database to determine if the hash code exists in the database comprises:
   determining if any flags in the database associated with the address exist; and
   indicating that a transaction is suspicious in response to a flag existing in the database entry associated with the address.

6. The method of claim 5, wherein the indicating that a transaction is suspicious in response to a flag existing in the database associated with the address comprises:
   sending an alert that the transaction is suspicious; and
   flagging the address in the database.

7. The method of claim 1, further comprising:
   indicating that the transaction is not suspicious in response to both the hash code and the geocode not existing in the database; and
   adding an entry into the database, wherein the entry comprises the hash code, geocode and the address.

8. A method for identifying a fraudulent address in a transaction, comprising:
   receiving address information associated with a transaction;
   querying, via computer processing device, a database to determine if the address information exists in the database;
   determining that the address information is suspicious in response to the address information existing in the database; and
   if the address information does not exist in the database,
      obtaining a geocode based on the address information, wherein the geocode comprises a geographic location of the address information;
      querying the database to determine if the geocode exists in the database; and
      determining that the address information is suspicious in response to the geocode existing in the database.

9. The method of claim 8, further comprising presenting an alert in response to the address information being determined to be suspicious.

10. The method of claim 8, wherein the determining that the transaction is suspicious in response to the geocode existing in the database further comprises flagging the address in the database.

11. The method of claim 10, wherein the determining that the address information is suspicious in response to the geocode existing in the database comprises:
   determining if any flags associated with the address information exists in the database; and
   indicating that the address associated with the address information is suspicious in response to a flag existing in the database associated with the address information.

12. A system for identifying fraudulent transactions, comprising:
   a computer processor; and
   a storage device comprising:
   a data structure operable on the processor to receive transaction information comprising an address;
   a data structure operable on the processor to create a hash code from the address;
   a data structure operable on the processor to query a database to determine if the hash code exists in the database;
   a data structure operable on the processor to determine whether or not the transaction is suspicious in response to the hash code existing in the database, wherein the transaction is considered suspicious if the hash code exists in the database; and
   a data structure operable on the processor operable in response to the hash code not existing in the database to obtain a geocode based on the address, wherein the geocode comprises an address code identifying a location of the address such that every address location has only a single geocode associated therewith;
   a data structure operable on the processor to query the database to determine if the geocode exists in the database; and
   a data structure operable on the processor to determine that the transaction is suspicious in response to the geocode existing in the database.

13. The system of claim 12, wherein the data structure operable on the processor to determine whether or not the transaction is suspicious in response to the hash code not existing in the database comprises:
   a data structure operable on the processor to indicate that the transaction is not suspicious in response to the hash code not existing in the database and in response to the geocode not existing in the database; and
   a data structure operable on the processor to add an entry into the database, wherein the entry comprises the hash code, geocode and the address.

14. The system of claim 12, wherein the data structure operable on the processor to query the database to determine if the geocode exists in the database is further configured to flag the address in the database if the geocode exists in the database, and wherein the data structure operable on the processor to determine whether or not the transaction is suspicious in response to the hash code not existing in the database comprises:

a data structure operable on the processor to determine if any flags in the database entry associated with the hash code exist; and a data structure operable on the processor to indicate that a transaction is suspicious in response to a flag existing in the database entry associated with the hash code.

15. A non-transitory computer-readable medium having computer executable instructions for performing a method for identifying fraudulent transactions, the computer-readable medium comprising computer executable instructions configured for causing a computer processing device to:

receive transaction information that comprises an address;

query a database to determine if the address exists in the database;

determine determining whether or not the transaction is suspicious in response to the address existing in the database, wherein the transaction is considered suspicious if the hash code exists in the database; and if the hash code does not exist in the database:

obtain a geocode based on the physical address, wherein the geocode comprises an address code identifying a location of the physical address such that every physical address location has only a single geocode associated therewith;

query the database to determine if the geocode exists in the database; and determine that the transaction is suspicious if the geocode exists in the database.

* * * * *